United States Patent
Castillo et al.

(10) Patent No.: US 9,584,662 B2
(45) Date of Patent: *Feb. 28, 2017

(54) SYSTEM AND METHOD FOR THE AUTOMATIC VALIDATION OF DIALOG RUN TIME SYSTEMS

(71) Applicant: AT&T Intellectual Property II, L.P., Atlanta, GA (US)

(72) Inventors: Cecilia Castillo, Tijeras, NM (US); Theodore J. Roycraft, Califon, NJ (US); James M. Wilson, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/950,062

(22) Filed: Nov. 24, 2015

(65) Prior Publication Data

US 2016/0080571 A1    Mar. 17, 2016

Related U.S. Application Data

(63) Continuation of application No. 14/221,435, filed on Mar. 21, 2014, now Pat. No. 9,213,692, which is a continuation of application No. 10/826,065, filed on Apr. 16, 2004, now Pat. No. 8,683,437.

(51) Int. Cl.
*H04M 3/51* (2006.01)
*G10L 15/193* (2013.01)
*G06F 17/27* (2006.01)
*H04M 3/22* (2006.01)
*H04M 3/493* (2006.01)
*G06F 17/28* (2006.01)
*G10L 15/18* (2013.01)
*G06F 9/44* (2006.01)

(52) U.S. Cl.
CPC .......... *H04M 3/5175* (2013.01); *G06F 9/44* (2013.01); *G06F 17/271* (2013.01); *G06F 17/2775* (2013.01); *G06F 17/28* (2013.01); *G10L 15/1822* (2013.01); *G10L 15/193* (2013.01); *H04M 3/22* (2013.01); *H04M 3/2218* (2013.01); *H04M 3/4936* (2013.01); *G06F 9/444* (2013.01)

(58) Field of Classification Search
CPC . G10L 15/193; G06F 17/2775; G06F 17/271; G06F 9/44; G06F 9/444
See application file for complete search history.

(56) References Cited

U.S. PATENT DOCUMENTS

| | | | | |
|---|---|---|---|---|
| 4,686,623 A | * | 8/1987 | Wallace | G06F 8/436 717/117 |
| 5,488,569 A | * | 1/1996 | Kaplan | H04M 3/42 379/201.03 |
| 5,754,760 A | * | 5/1998 | Warfield | G06F 11/3676 714/35 |

(Continued)

*Primary Examiner* — Samuel G Neway

(57) ABSTRACT

A method, system and module for automatically validating dialogs associated with a spoken dialog service. The method comprises extracting key data from a dialog call detail record associated with a spoken dialog service, transmitting the key data as a dialog to a state-based representation (such as a finite-state machine) associated with a call-flow for the spoken dialog service and determining whether the dialog associated with the key data is a valid dialog for the call-flow.

20 Claims, 2 Drawing Sheets

(56) References Cited

U.S. PATENT DOCUMENTS

| | | | |
|---|---|---|---|
| 6,173,266 B1 * | 1/2001 | Marx | G10L 15/22 704/270 |
| 6,219,643 B1 * | 4/2001 | Cohen | G10L 15/22 379/88.18 |
| 6,243,092 B1 * | 6/2001 | Okita | G06F 8/34 700/83 |
| 6,292,909 B1 * | 9/2001 | Hare | H04L 12/2697 379/10.01 |
| 6,321,198 B1 * | 11/2001 | Hank | H04M 3/4936 704/270 |
| 6,374,308 B1 * | 4/2002 | Kempf | G06F 9/465 715/762 |
| 6,785,643 B2 * | 8/2004 | Hayosh | G06F 17/2775 704/257 |
| 6,823,054 B1 * | 11/2004 | Suhm | H04M 3/36 379/112.01 |
| 6,961,776 B1 * | 11/2005 | Buckingham | G06F 9/541 709/219 |
| 7,117,158 B2 * | 10/2006 | Weldon | H04M 3/493 704/270 |
| 7,143,042 B1 * | 11/2006 | Sinai | G10L 15/22 704/270.1 |
| 7,177,814 B2 * | 2/2007 | Gong | H04M 3/4931 704/231 |
| 7,181,386 B2 * | 2/2007 | Mohri | G06F 17/27 704/1 |
| 7,184,967 B1 * | 2/2007 | Mital | G06Q 10/10 705/7.26 |
| H2187 H * | 4/2007 | Yuchimiuk | 704/246 |
| 7,302,383 B2 * | 11/2007 | Valles | G06F 17/2785 704/231 |
| 7,945,903 B1 * | 5/2011 | Castillo | G06F 8/35 717/105 |
| 8,381,200 B2 * | 2/2013 | Castillo | G06F 8/35 717/105 |
| 8,683,437 B1 * | 3/2014 | Castillo | G06F 17/28 717/124 |
| 2002/0032564 A1 * | 3/2002 | Ehsani | G06F 17/2775 704/235 |
| 2003/0041314 A1 * | 2/2003 | Heeren | G06F 8/34 717/109 |
| 2003/0046626 A1 * | 3/2003 | Hand, Jr. | G06F 11/3664 714/738 |
| 2003/0066051 A1 * | 4/2003 | Karr | G06F 8/31 717/114 |
| 2003/0067496 A1 * | 4/2003 | Tasker | H01J 37/28 715/846 |
| 2003/0217190 A1 * | 11/2003 | Devine | G06F 8/34 719/318 |
| 2003/0229855 A1 * | 12/2003 | Gorelov | G06F 17/2264 715/234 |
| 2005/0080628 A1 * | 4/2005 | Kuperstein | H04M 3/4938 704/270.1 |
| 2005/0228668 A1 * | 10/2005 | Wilson | G10L 15/22 704/256 |
| 2006/0025997 A1 * | 2/2006 | Law | G10L 15/28 704/257 |
| 2006/0147020 A1 * | 7/2006 | Castillo | G06F 11/3604 379/220.01 |
| 2006/0155526 A1 * | 7/2006 | Castillo | G06F 8/34 704/1 |
| 2014/0288921 A1 * | 9/2014 | Castillo | G06F 17/28 704/9 |

* cited by examiner

SYSTEM AND METHOD FOR THE AUTOMATIC VALIDATION OF DIALOG RUN TIME SYSTEMS

PRIORITY INFORMATION

The present application is a continuation of U.S. patent application Ser. No. 14/221,435, filed Mar. 21, 2014, which is a continuation of U.S. patent application Ser. No. 10/826,065, filed Apr. 16, 2004, now U.S. Pat. No. 8,683,437, issued Mar. 25, 2014, the contents of which is incorporation herein by reference in its entirety.

RELATED APPLICATIONS

The present invention is related to U.S. patent application Ser. No. 10/826,064, filed Apr. 16, 2004, now abandoned, the contents of which are incorporated herein by reference.

BACKGROUND OF THE INVENTION

1. Field of the Invention

The present invention relates to spoken dialog systems and more specifically to a system and method of automatically validating the run-time behavior of a spoken dialog service with the call-flow specification.

2. Introduction

A spoken dialog system is typically represented by a call flow. The call flow is essentially a graph or network, possibly containing cycles over parts of the network. The incorporated application above discloses a rooted tree having a root node, descendent nodes, and leaf nodes. A path from the root node to a leaf node represents a specific dialog. A call flow can contain huge (tens of thousands) or even unbounded numbers of unique dialogs.

Typically, a spoken dialog developer will manually inspect the call flow to generate dialog test cases and scenarios for testing the spoken dialog system. This is a time consuming process and is prone to error. Further, such as process can be incomplete because not every possible sentence or portion of a dialog will be tested. As a result, when the spoken dialog service is deployed, its run-time behavior may not match the call-flow specification. An expert developer's time is then required to test and identify problems with the implementation of the call-flow to determine where the run-time system deviates from the call-flow.

The time and expense of correcting run-time errors in a spoken dialog system may prevent many companies or individuals from deploying such a system for their business. What is needed in the art is a system and method of automatically validating a run-time spoken dialog system to determine and correct its run-time behavior vis-à-vis the call-flow specification.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

A method, system and module for automatically validating dialogs associated with a spoken dialog service. The method comprises extracting key data from a dialog call detail record associated with a spoken dialog service, transmitting the key data as a dialog to a state-based representation (such as a finite-state machine) associated with a call-flow for the spoken dialog service and determining whether the dialog associated with the key data is a valid dialog for the call-flow specification. Other embodiments include, but are not limited to, a dialog management check module practicing the steps set forth herein, a computer-readable medium storing computer-executable instructions to practice the method disclosed herein and a spoken dialog service implementation of the invention.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

As introduced above, the present invention relates to a system and method of automatically testing the run-time behavior of a spoken dialog service as compared against its call-flow specification. The system aspect of the invention comprises a computing device programmed to perform the steps outlined herein. The specific type or configuration of the computing device is immaterial to the present invention.

The method aspect of the invention may be practiced by using any programming language for instructing a computing device to carry out the steps of the invention. A concept that is important to understand in spoken dialog services is the call-flow specification.

Figure 1:
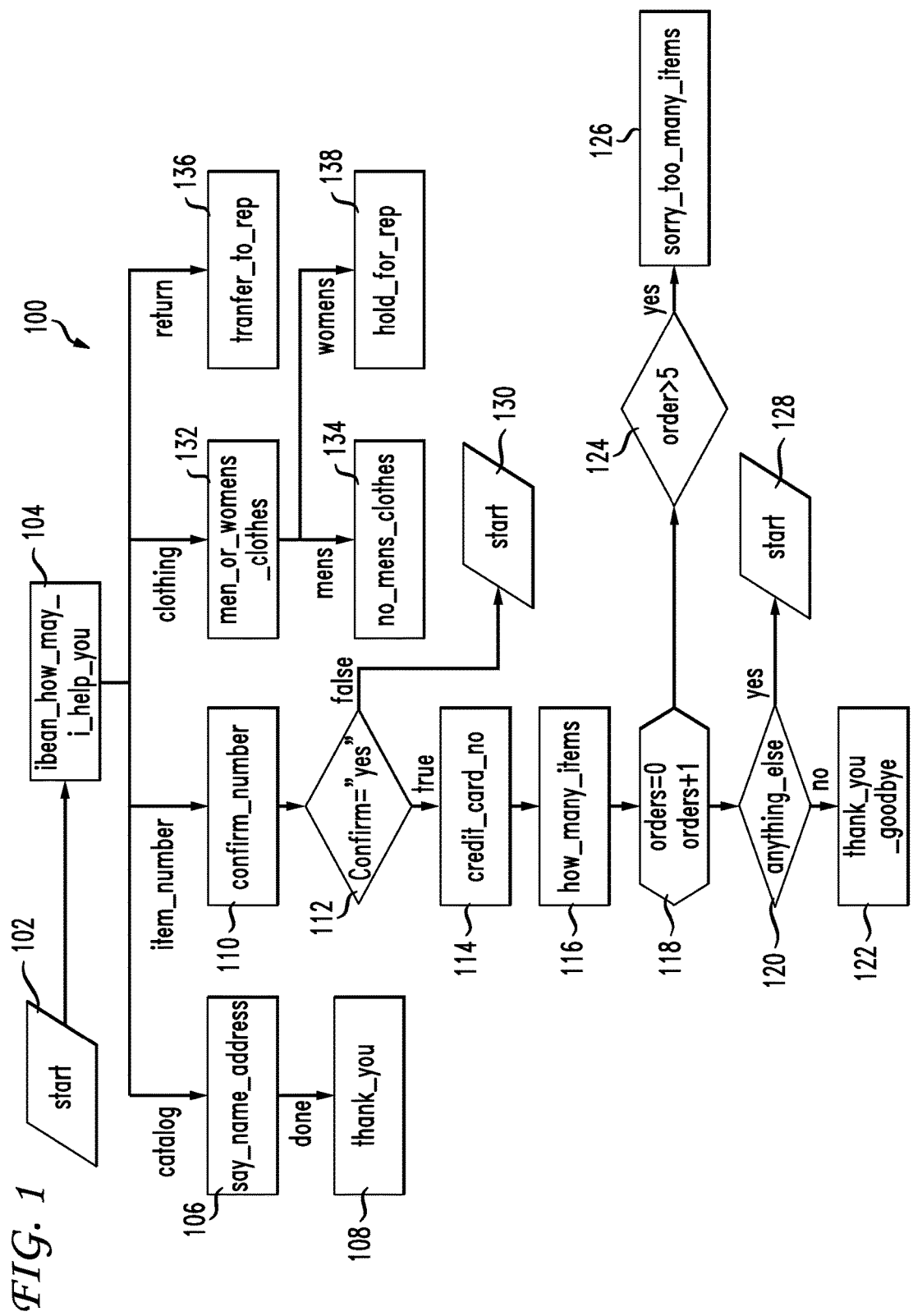
FIG. 1 illustrates an example call-flow for a spoken dialog system.

FIG. 1 illustrates an example call-flow 100 for a mail order company. The call-flow 100 illustrates how a phone customer could accomplish one of four tasks: (1) request a catalog; (2) buy by item by item number; (3) inquire about clothing; or (4) request a return. During the course of the conversation with the customer, the dialog progresses through the call-flow 100 guided by the customer's utterances and the spoken dialog system responds to the customer with prompts.

Each state (point) in the call-flow 100 can have one or more state variables associated with the state. These variables can have string or numeric values and can be created, tested or changed as the dialog progresses through the call-flow 100 and the values of these variables can affect the flow.

The shapes of the boxes on the call-flow have special meanings. The parallelograms refer to a starting state. The rectangles represent prompts to customers. The diamonds are state variable boolean tests and the hexagons reflect state variable manipulation.

Lines with arrows show possible transitions between states and each arrow is labeled by what is determined to be the customer's intent. So, for example, after the starting point 102, the first prompt is "How may I help you?" 104. In response, the customer may say "I'd like to order item number B453 from your catalog". Other software in the system determines the customer's intent from this response. This is typically determined from a dialog manager module in the spoken dialog system. In this example, the intent is determined to be "item_number" and thus this path in the call-flow 100 is followed. The prompt asks the user to confirm the item number 110 and if the confirmation is affirmative ("yes") 112, then the prompt asks for a credit card number 114 and the number of items 116. In this call-flow, the system increments the number of items on order 118 and determine whether a threshold has been reached 124. If yes, then the system prompts that too many items have been ordered 126. If the threshold is not reaches, then system asks if the customer would like anything else 120 and if yes, it starts over 128. If no, then the prompt says good bye and thank you 122.

If the user at stage 104 asks for clothing, the system asks for clothing for men or women cloths 132. If the clothing is for men, the system states that they have no mens clothing 134. If the response is that cloths for women are desired, then the prompt holds for a representative 138. If the user responds at stage 104 that they want to return an item, the system tells the user that they will be transferred to a representative 136.

If the user's utterance indicates a desire for a catalog, the prompt 106 asks for the customer to say their name and address. Once that is received, the system says "thank you" 108 and completes the process.

In this manner, the spoken dialog system steps through the call-flow. It can be appreciated that there are many variations of call-flows depending on the type of application. FIG. 1 only provides an example for the purpose of illustrating the present invention. The representation of the call-flow in FIG. 1 is a convenient way for the call-flow designer to view the call-flow but that is not a suitable form for the runtime system to use and it is not suitable for testing or validating dialogs associated with run-time verification or system testing.

Figure 2:
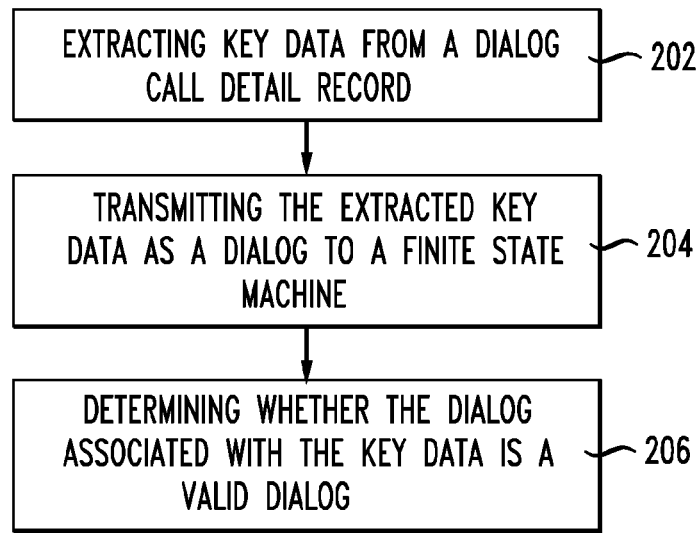
FIG. 2 illustrates an embodiment of the present invention.

The present invention addresses the need to simplify and speed up the process of run-time validation and testing spoken dialog services. FIG. 2 illustrates an example flow diagram of the method.

The method comprises automatically extracts key data from a dialog's call detail record (CDR), which is a trace of the dialog (102). The CDR may include a record of all the details regarding a particular call such as the prompts issued to the user, the responses back from the user and the system interpretation of the response. Other non-speech input may be interpreted and included in the CDR as well. The method then comprises transmitting the extracted key data as a dialog to a finite state machine (104) or to an equivalent mechanism to the finite-state machine. The finite state machine (FSM) represents the call-flow and accepts the extracted data. A call-flow, while typically represented graphically, represents a series of input and output actions. A sequence of actions can then be viewed words or a sentence that is valid for the call-flow. There is a process for converting a call-flow into a FSM or similar mechanism to be used when practicing the present invention. Any state-based representation known to those of skill in the art will be adequate for practicing the invention.

To begin the conversion, a process converts the call-flow form to an augmented context free grammar notation. Such sentences can be alternatively represented textually via a Backus-Naur Form (BNF) or grammar. A BNF in turn can be implemented as a finite state machine or FSM. The BNF is a text language used to specify the grammars of programming languages. The following augmented BNF representation of the call-flow of FIG. 1 was created from a Visio representation of the call-flow by a dialog manager designer program.

```
// dmdesigner
// File: llbean.vsd
// Created: 3/24/2003 10:41:12 AM
// Total number of pages: 1
#define WATSON_INSERT_SILENCE 2
// page Page-1
// Warning: shape orders=orders+1 missing labeled line
// Warning: shape orders=orders+1 missing labeled line
// Error: decision orders>5 must have two branches
<start> = llbean_how_may_I_help_you\out
        ( catalog\in say_name_address\out done\in thank_you\out |
        item_number\in confirm_number\out
            ( Confirm\eqyes credit_card_no\out how_many_items\out orders\add1
                (sorry_too_many_items\out |
                anything_else\out
                    ( yes\in <start> |
                    no\in thank_you_goodbye\out)) |
            Confirm\neyes <start>) |
        clothing\in men_or_womens_clothes\out
            ( mens\in no_mens_clothes\out |
            womens\in hold_for_rep\out) |
        return\in transfer_to_rep\out) ;
// Rule list errors/warnings:
// Rule map list: rule name, page name, page index, shape index, page refs
//      start,          "Page-1", 1, 1, "Page-1,34,Page-1,18,"
// State variable list:
//      _null
//      _tracelevel
```

```
// Warning: state variable Confirm referenced but not defined - see page,shape#
Page-1,0,
//          Confirm
//          orders
// Input function list: name, page ref
//          catalog         Page-1,0,
//          clothing        Page-1,0,
//          done            Page-1,0,
//          item_number     Page-1,0,
//          mens            Page-1,0,
//          no              Page-1,0,
//          return          Page-1,0,
//          womens          Page-1,0,
//          yes             Page-1,0,
// Output function list: name, page ref
//          anything_else           Page-1,0,
//          confirm_number          Page-1,0,
//          credit_card_no          Page-1,0,
//          hold_for_rep            Page-1,0,
//          how_many_items          Page-1,0,
//          llbean_how_may_I_help_you Page-1,0,
//          men_or_womens_clothes   Page-1,0,
//          no_mens_clothes         Page-1,0,
//          say_name_address        Page-1,0,
//          sorry_too_many_items    Page-1,0,
//          thank_you               Page-1,0,
//          thank_you_goodbye       Page-1,0,
//          transfer_to_rep         Page-1,0,
// Default function list: name, age ref
// Tag function list: function name, page name, page index, shape index
// 3 Warnings
// 1 Errors
// 1 Rule Names
// 0 Tag Functions
// 9 Input Functions
// 13 Output Functions
// 0 Default Functions
// 4 State Variables
```

The BNF is called augmented because in addition to simply naming the state transitions, a naming convention is used to assign additional meanings to the state transitions. A suffix in the form '\xyz' is added to the transition name to give that transition a special meaning.

For example, in the demonstration, the first prompt is 'llbean_how_may_I_help_you\out'. The '\out' suffix indicates that this is a prompt and the name of the prompt is 'llbean_how_may_I_help_you'. Similarly, 'item_number\in' represents the user intent (or category) to place an order by item number. Some of the valid suffixes and meanings are:

| | | |
|---|---|---|
| a. <PromptName>\out | | - prompt using <PromptName>, e.g. hello\out |
| b. <category>\in | | - category (or user intent) named <category>, e.g. buy\in |
| c. <var>\set<value> | | - set state variable <var> to <value>, e.g. counter\set0 |
| d. <var>\add<value> | | - add <value> to state variable <var>, e.g. counter\add4 |
| e. <var>\eq<value> | | - is <var> equal to <value>?, e.g. counter\eq0 |
| f. <var>\ne<value> | | - is <var> not equal to <value>?, e.g. counter\ne0 |
| g. etc. | | |

Normally, a BNF network representation consists of a sequence of terminal and non-terminal elements connected by binary operations, e.g. "and", "or", which guide the path through the BNF network. A sequence of input tokens causes the network to be traversed as long as the network accepts (matches) the list of input tokens with the current terminal. Eventually, either a terminal state (final state) will be reached or else a terminal state won't be reached because the sequence of input tokens was not compatible with the BNF network.

In the augmented BNF, the notion of terminals is extended. Normally, terminals are fixed entities such as "dog", "cat", etc. An aspect of the present invention involves extending the notion of terminals by first creating a set of classes of terminals. Within each class, different terminals of that class may be defined by name. For one example implementation, if classes are chosen as "in", "out", numeric and string operators, "tag", "def", and "func" are defined. The "in" classes are used to match input tokens and to execute a particular generated function when that input terminal name is matched by an input token; "out" classes are used to represent "output" actions (such as issuing a prompt) when that terminal is reached; "tag" terminals are executed as the process passes through them and are generally used to mark progress through the network typically for logging and tracing.

Operator classes can test or modify the values of state variables and change the flow based on the operator and the values it operates on. If a test is 'true', the process passes to the next state; if it is false, the path is blocked.

State variables consist of a set of string or numeric variables associated with each state in the network. As the process glides through the network, states that are passed through inherit the values of the state variables from the previous state but have their own copy. State variables that are modified by a downstream state don't affect state variables that are upstream in the network.

The "func" terminals cause the named function to be executed as the process passes through that terminal. That function may return a value that either blocks passage through that terminal or permits passage.

Normally, to pass through a terminal, an input token must match it. In the augmented BNF, the only terminal that must be matched by an input token is the "in" class token. All others are simply passed through to the next terminal as long as the actions performed for that particular terminal permit passage through it. For those terminals other than the "in" class, as they are passed through, certain actions are implied based on the type of class that is passed through. It is also possible for actions specific to that particular augmented terminal to take place. Because it is possible that there are multiple valid paths out of a particular state (the network is nondeterministic), the process must "look ahead" in the network until it comes to a blocking state or the process finishes successfully at a final state. If the process encounters a blocking path, it must backtrack to the previous state and check the next valid path out of that state. This is done recursively until it eventually finds a path that ends up at a valid final state or it is determined that there is no valid path to the final state.

Since the process must backtrack at times, it keeps the set of state variables on a stack. As the process moves to a new state, it makes a copy of all the state variables and pushes the set of them on the stack. If the process has to backtrack, it pops the last state off the stack to restore a valid state to the state the process backtracked to.

When the augmented BNF is implemented as an FSM, it will accept sentences that are in the grammar defined by the BNF. The basic process outlined in FIG. 1 can enable automatic validation of individual dialogs generated via a deployed dialog system and automatic validation of individual dialogs generated from a system test of a dialog system.

The complement of this process is a method for automatically generating system test cases, disclosed in U.S. patent application Ser. No. 10/826,064, incorporated herein by reference. If both the automatic means for generating test dialogs and the automatic means for validating dialogs are both available, then a fully automated system for generating, executing, and validating dialogs can be created. A fully automated embodiment of the present invention is illustrated in FIG. 3.

Figure 3:
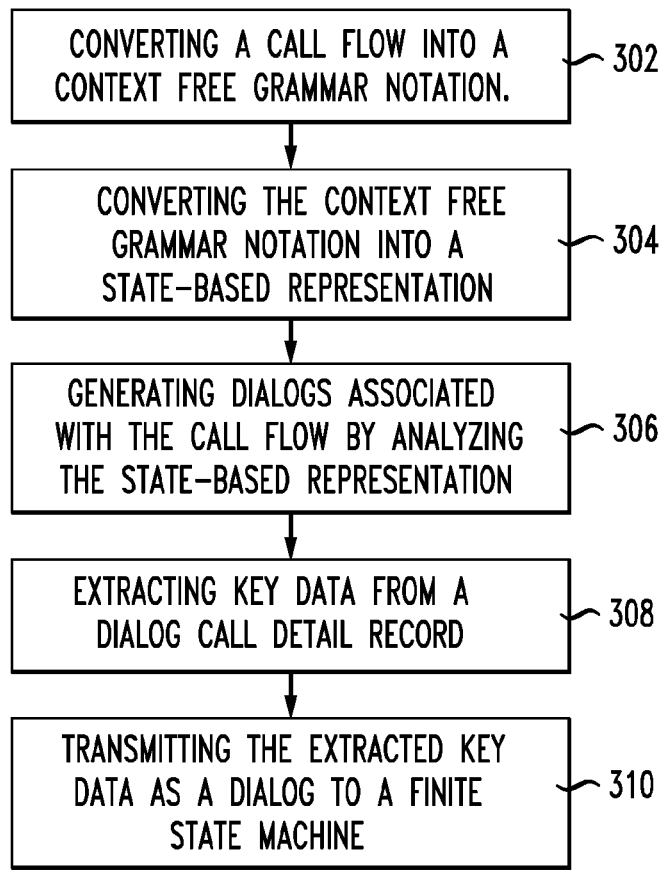
FIG. 3 illustrates a method according to an aspect of the invention.

The process shown in FIG. 3 assumes the availability of a call-flow in a Visio form or another similar format. The first step comprises converting a call-flow into a context free grammar notation (302). Preferably, this is a BNF representation. The augmented BNF is used to automatically generating the test dialogs. Another step in the present invention comprises converting or creating a state-based representation from the BNF (304). The preferred state-based representation is a finite state machine although other representations may be utilized. Next, the process comprises generating dialogs associated with the call-flow by analyzing the state-based representation (306). The generated dialogs are then used to automatically test the spoken dialog system with a more complete set of sentences and dialogs than could otherwise be manually generated.

Once the spoken dialog system is deployed, the method of FIG. 3 further comprises extracting key data from a call detail record (308). The extracted key data is transmitted as a dialog to a finite state machine (310) or similar apparatus. From step (310), the method determines whether the dialog associated with the key data is a valid dialog. This can occur by determining whether the FSM has accepted the dialog in that the FSM will accept sentences that are in the grammar defined by the BNF.

The process disclosed herein of validating the spoken dialog system provides an automatic method of testing a system using real calls or automated calls to the system. For example, either during a testing process or after a spoken dialog system is deployed in the field, this invention can extract data from a call detail record and determine whether a particular call pattern, i.e., the system responses and flow of the call, followed the established call flow. If the system deviated from the call flow or took a route not identified in the call flow, then the system designers know that there is a problem with the system and corrections can be made.

In a testing phase of deployment of a spoken dialog system, a dialog manager generation tool, such as that disclosed in U.S. patent application Ser. No. 10/826,064, incorporated herein by reference, may be utilized to generate testing dialogs. Having applied the testing dialogs to the spoken dialog system, the present invention identifies whether the system response and call flow is consistent with the programmed call flow.

The process makes novel use of the fact that a call flow can be represented by an equivalent BNF (a context free grammar notation) that in turn can be converted into a finite state machine (FSM). The FSM representation permits algorithms developed and applied that "walk" the FSM from the root to a leaf of the FSM. Each such traversal of the FSM represents a valid path through the call-flow and can be automatically mapped to specific points in the call-flow. Hence, each path through the FSM can generate a test dialog or scenario.

Any system that can be represented by a graphical call flow (or BNF or FSM) and needs to generate unique paths (e.g., for testing or analysis) through the flow can benefit from this process. This applies to human-machine, human-human, and machine-machine interactions.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the invention is not limited to generating BNF's or FSM's in the process of automatically generating test dialog sentences and automatic validation of dialogs in either a run-time test or system test if a spoken dialog system. No specific programming language is required for programming the automated process. Accordingly, the appended claims and their legal equivalents should only define the invention, rather than any specific examples given.

We claim:

1. A method comprising:
converting, via a processor, a call flow into a context free grammar notation;
converting the context free grammar notation into a finite state machine;
generating test dialogs associated with the call flow according to paths through the finite state machine;
extracting key data from a dialog call detail record from a dialog in the test dialogs;
transmitting, to the finite state machine, the key data; and
determining, based on the key data being accepted by the finite state machine, that the dialog is a valid dialog for the call flow.

2. The method of claim 1, wherein the dialog call detail record comprises a prompt issued to a user and a response from the user.

3. The method of claim 2, wherein the dialog call detail record further comprises an interpretation of the response.

4. The method of claim 1, wherein state-based representation comprises a Backus-Naur Form.

5. The method of claim 4, wherein the Backus-Naur Form comprises a sequence of terminal elements and non-terminal elements.

6. The method of claim 5, wherein an in class terminal element of the sequence of terminal elements requires a matching class token.

7. The method of claim 1, further comprising testing the finite state machine prior to the generating of the test dialogs associated with the call flow.

8. The method of claim 7, wherein the testing of the finite state machine is performed using stored real-call records.

9. A system comprising:
a processor; and
a computer-readable storage medium having instructions stored which, when executed by the processor, cause the processor to perform operations comprising:
converting a call flow into a context free grammar notation;
converting the context free grammar notation into a finite state machine;
generating test dialogs associated with the call flow according to paths through the finite state machine;
extracting key data from a dialog call detail record from a dialog in the test dialogs;
transmitting, to the finite state machine, the key data; and
determining, based on the key data being accepted by the finite state machine, that the dialog is a valid dialog for the call flow.

10. The system of claim 9, wherein the dialog call detail record comprises a prompt issued to a user and a response from the user.

11. The system of claim 10, wherein the dialog call detail record further comprises an interpretation of the response.

12. The system of claim 9, wherein state-based representation comprises a Backus-Naur Form.

13. The system of claim 12, wherein the Backus-Naur Form comprises a sequence of terminal elements and non-terminal elements.

14. The system of claim 13, wherein an in class terminal element of the sequence of terminal elements requires a matching class token.

15. The system of claim 9, the computer-readable storage medium having additional instructions stored which, when executed by the processor, cause the processor to perform operations comprising:
testing the finite state machine prior to the generating of the test dialogs associated with the call flow.

16. The system of claim 15, wherein the testing of the finite state machine is performed using stored real-call records.

17. A computer-readable storage device having instructions stored which, when executed by a computing device, cause the computing device to perform operations comprising:
converting a call flow into a context free grammar notation;
converting the context free grammar notation into a finite state machine;
generating test dialogs associated with the call flow according to paths through the finite state machine;
extracting key data from a dialog call detail record from a dialog in the test dialogs;
transmitting, to the finite state machine, the key data; and
determining, based on the key data being accepted by the finite state machine, that the dialog is a valid dialog for the call flow.

18. The computer-readable storage device of claim 17, wherein the dialog call detail record comprises a prompt issued to a user and a response from the user.

19. The computer-readable storage device of claim 18, wherein the dialog call detail record further comprises an interpretation of the response.

20. The computer-readable storage device of claim 17, wherein state-based representation comprises a Backus-Naur Form.

* * * * *